US011796992B2

(12) United States Patent
Stano et al.

(10) Patent No.: US 11,796,992 B2
(45) Date of Patent: Oct. 24, 2023

(54) CONDITION-BASED METHOD FOR MALFUNCTION PREDICTION

(71) Applicant: Hitachi Energy Switzerland AG, Baden (CH)

(72) Inventors: Pawel Stano, Cracow (PL); Frank Kirschnick, Adliswil (CH)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/342,178

(22) Filed: Jun. 8, 2021

(65) Prior Publication Data
US 2021/0382473 A1 Dec. 9, 2021

(30) Foreign Application Priority Data

Jun. 8, 2020 (EP) .................................... 20178839

(51) Int. Cl.
G05B 23/02 (2006.01)
(52) U.S. Cl.
CPC ..... *G05B 23/0283* (2013.01); *G05B 23/0281* (2013.01)
(58) Field of Classification Search
CPC .... G05B 23/00; G05B 23/02; G05B 23/0205; G05B 23/0259; G05B 23/0286; G05B 23/0283; G05B 23/0275; G05B 23/0281; G05B 23/0243; G05B 23/0254; G06N 7/00; G06N 7/005; G06N 7/08
See application file for complete search history.

(56) References Cited

U.S. PATENT DOCUMENTS

| 2015/0106058 | A1* | 4/2015 | Mazzaro | G01M 99/005 702/181 |
| 2017/0039479 | A1* | 2/2017 | Chen | G16H 50/30 |
| 2017/0236064 | A1* | 8/2017 | Kirschnick | F01D 21/003 702/35 |
| 2017/0236065 | A1 | 8/2017 | Kirschnick | |
| 2018/0225585 | A1* | 8/2018 | Dong | G06N 7/08 |
| 2020/0412933 | A1* | 12/2020 | Matsuda | H04N 5/232411 |
| 2021/0183508 | A1* | 6/2021 | Parker | A61B 5/742 |

OTHER PUBLICATIONS

Elattar, H., "Intelligent information system to forecast the remaining life of aircraft turbofan engine", Thesis to Information Systems Department, Faculty of Computers and Information Sciences, Mansoura University, Jan. 2011, total 117 pages.
Zhang, Xiaodong, et al., "An integrated Approach to Bearing Fault Diagnostics and Prognostics", 2005 American Control Conference, Portland, OR, USA, Jun. 8-10, 2005, 6 pages.

(Continued)

*Primary Examiner* — Son T Le
*Assistant Examiner* — Matthew W. Baca
(74) *Attorney, Agent, or Firm* — Slater Matsil, LLP

(57) ABSTRACT

To perform a prognostic health analysis for an asset, a plurality of independent stochastic simulations are performed using transition probabilities of a discrete Markov Chain model. A prognostic asset health state evolution is computed over a time horizon from the plurality of independent stochastic simulations. An output is generated based on the computed prognostic asset health state evolution.

26 Claims, 5 Drawing Sheets

(56) References Cited

OTHER PUBLICATIONS

Tobon-Mejia, D. A., et al., "Hidden Markov Models for Failure Diagnostic and Prognostic", 2011 Prognostics & System Health Management Conference, Jun. 2011, 8 pages.

Dong, Ming, et al., "A segmental hidden semi-Markov model (HSMM)-based diagnostics and prognostics framework and methodology", Mechanical Systems and Signal Processing, vol. 21, Issue 5, Jul. 2007, pp. 2248-2266.

* cited by examiner

CONDITION-BASED METHOD FOR MALFUNCTION PREDICTION

CROSS-REFERENCE TO RELATED APPLICATIONS

This application claims the benefit of European Patent Application No. 20178839.5, filed on Jun. 8, 2020, which application is hereby incorporated herein by reference.

TECHNICAL FIELD

The invention relates to techniques for assessing a health of an asset. The invention relates in particular to methods and devices for the prognostic assessment of asset health.

BACKGROUND

Electric power systems, such as power generation, transmission and/or distribution system, and industrial systems include assets. Transformers, power generators, and distributed energy resource (DER) units are examples for such assets. The assets are subject to degradation during operation. For planning purposes, scheduling maintenance or replacement work, it is desirable to estimate the remaining useful life (RUL) of assets.

RUL estimations may be based on sensor data for a fleet of assets of the same or a similar type as the asset for which the RUL is to be estimated. The sensor data may be labeled with failure signatures, indicating whether the sensor data corresponds to normally operative, degraded, or failed states of an asset. As different types of sensor data may be available for different assets in the fleet, depending, e.g., on the manufacturer or on accessory sensors installed with the asset, it may be challenging to combine such sensor data for RUL estimation.

Y. Yu et al., "Remaining Useful Life Prediction Using Elliptical Basis Function Network and Markov Chain", World Academy of Science, Engineering and Technology, 47, 2010 describes a method for remaining useful life prediction using the Elliptical Basis Function (EBF) network and a Markov chain. The EBF structure is trained by a modified Expectation-Maximization (EM) algorithm in order to take into account the missing covariate set. No explicit extrapolation is needed for internal covariates while a Markov chain is constructed to represent the evolution of external covariates.

SUMMARY

Embodiments can provide enhanced techniques of predicting the time-evolution of asset degradation. Particular embodiments provide techniques that allow the prognostic predictions to be made for a degradation of a health of an asset, without necessarily requiring sensor data captured for that specific asset for which the prediction is being made. Alternative or addition embodiments provide techniques that can use historical sensor data from a fleet of assets for making the prediction, even when different types of sensor data are available for different assets in the fleet.

According to embodiments of the invention, methods and computing system s as recited in the independent claims are provided. The dependent claims define preferred embodiments.

According to embodiments of the invention, a discrete Markov Chain model may be used to predict the performance degradation of an asset. A Markov Chain Monte Carlo (MCMC) method may be employed to perform a large number of simulations. The Markov Chain model may have a set of discrete states that correspond to different asset health states.

A potentially large volume of historical sensor data captured may be condensed into a small number of transition probabilities. For illustration, the Markov Chain model may be set up in such a way that only two or three transition probabilities govern the transitions between the states, which may be indicative of a healthy asset state, a degraded asset state in which the asset is still operative, and a failed asset state in which the asset has failed. The invention can also be applied to cases in which little or no historical data is available. The transition probabilities of the Markov Chain model may then be set by a human expert.

Transition probabilities between the states of the Markov Chain model may be determined based on sensor data that are labeled with failure signatures and that are captured on a fleet of assets.

Different transition probabilities may be used for simulations that are run in parallel. The different transition probabilities may be associated with different operating conditions and/or ambient conditions.

Information on a variance, confidence interval, or other reliability indicator may be determined from the simulations.

MCMC techniques that employ a small state space and a small number of transition probabilities allow prognostic asset health analysis to be performed over various time horizons, including time horizons that may be several years or longer. Various other simulation approaches that aim at more detailed modeling of the asset behavior may be suitable for assessing asset degradation on shorter time scales, but may be subject to instabilities over the longer time periods that are relevant for asset health analysis of electric power system assets or industrial assets.

A method of performing a prognostic health analysis for an asset, in particular for determining a remaining useful life, RUL, or probability of failure (PoF) according to an embodiment comprises performing a plurality of independent stochastic simulations using transition probabilities of a discrete Markov Chain model. The discrete Markov Chain model has a state space that comprises a set of asset health states. Each of the plurality of independent stochastic simulations simulates a future evolution in the state space of the discrete Markov Chain model over a prognostic horizon. The method may further comprise computing a prognostic asset health state evolution over the prognostic horizon from the plurality of independent stochastic simulations. The method may further comprise generating output based on the computed prognostic asset health state evolution.

The asset may be an electric power system asset or an industrial asset.

Computing the prognostic asset health state evolution may comprise computing a RUL.

Computing the prognostic asset health state evolution may comprise computing a probability of failure of the asset over the prognostic horizon as a function of time.

The method may further comprise computing confidence information for the prognostic asset health state evolution as a function of time over the prognostic horizon from the plurality of independent stochastic simulations.

The output may further be generated based on the confidence information.

The confidence information may comprise a time evolution of a confidence interval over the prognostic horizon.

The method may further comprise computing variance information for the prognostic asset health state evolution as a function of time over the prognostic horizon from the plurality of independent stochastic simulations.

The output may further be generated based on the variance information.

The variance information may comprise a time evolution of a variance interval over the prognostic horizon.

The confidence or variance information may comprise a time evolution of a lower boundary and a time evolution of an upper boundary.

The lower boundary may be associated with a first set of transition probabilities and the upper boundary may be associated with a second set of transition probabilities different from the first set of transition probabilities.

The output may comprise a representation of the evolution of the asset health state, an alarm or warning generated based on the evolution of the asset health state, and/or a control signal to control operation of the asset based on the evolution of the asset health state.

The method may comprise deriving the first set of transition probabilities from first sensor data of assets operating under first conditions (e.g., first operating and/or ambient conditions) and deriving the second set of transition probabilities from second sensor data of assets operating under second conditions (e.g., second operating and/or ambient conditions) different from the first operating conditions.

The state space may consist of three states, four states, or more than four states.

The state space may comprise at least one state in which operation of the asset is not adversely affected by a failure.

The state space may comprise at least one state in which operation of the asset is adversely affected by a failure, but the asset continues to operate.

The state space may comprise a state in which the asset is inoperative due to a failure.

Computing the prognostic asset health state evolution may comprise computing, for a plurality of times within the prognostic horizon, a probability distribution in the state space and mapping the probability distribution to a scalar.

The scalar may be the probability for the asset to be in the state in which the asset is inoperative due to a failure, as determined by the plurality of independent simulations.

The prognostic asset health state evolution may be obtained as a time evolution of the scalar.

The method may further comprise determining the transition probabilities from historical data comprising sensor data for a plurality of assets.

The sensor data may be labeled with failure signatures indicating at which time the respective asset was in which state of the state space of the Markov Chain model.

The failure signatures may be computed automatically or may be assigned based on a received input from a human expert or may be assigned as a combination of both aforementioned approaches.

Determining the transition probabilities may comprise computing a time-dependent scalar function from the sensor data for the plurality of assets.

The scalar function may be computed using heuristics that use sensor measurements as inputs and output the scalar function.

Determining the transition probabilities may comprise identifying transitions within the state space of the Markov Chain model based on the time-dependent scalar function.

Determining the transition probabilities may comprise computing the transition probabilities based on the transitions within the state space of the Markov Chain model.

The determining step may comprise comparing the scalar function to one or several thresholds.

The scalar function may be representative of a health index, indicating a severity of degradation.

The determination of the transition probabilities may be performed independently for different groups of sensor data, indicating different operating conditions and/or ambient conditions of the assets in the fleet.

The method may comprise determining plural sets of transition probabilities, each associated with for different operating conditions and/or ambient conditions.

While plural sets of transition probabilities may be determined for different operating conditions and/or ambient conditions, the state space of the Markov Chain model may remain the same.

The method may comprise selecting one of the plural sets of transition probabilities for performing the simulations, depending on the operating conditions and/or ambient conditions to which the asset is intended to be subjected.

The method may comprise performing the plurality of independent stochastic simulations such that one or several first simulations are performed using a first set of transition probabilities associated with first operating conditions and/or first ambient conditions, and one or several second simulations are performed using a second set of transition probabilities associated with second operating conditions and/or second ambient conditions, wherein the first transition probabilities are different from the second transition probabilities.

The different operating conditions may be indicative of different load, different voltage, different current, different operating points, different insulation fluid, without being limited thereto.

The different ambient conditions may be indicative of different temperature, different relative humidity, without being limited thereto.

The plurality of independent stochastic simulations may be Markov Chain Monte Carlo (MCMC) simulations.

The Markov Chain may be homogeneous. The transition probabilities may be independent of time.

The Markov Chain may have order 1, i.e., transitions may be dependent on the state in which the Markov Chain model is currently, while being independent of previous transitions to that state.

The Markov Chain model may be such that states have qualitative interpretation that is monotonically ordered, i.e., it is always possible to compare two states in terms of severity of degradation.

Each state of the state space may have a non-zero transition probability to at most one other state of the state space, which describes more severe degradation, and non-zero transition probability to itself.

The Markov Chain model may be such that states of the state space that do not correspond to failure of the asset have a non-zero transition probability to just one other state of the state space.

The Markov Chain model may be such that a state of the state space that corresponds to failure of the asset does not have any non-zero transition probability to a state other than itself.

The Markov Chain model may be a finite Markov Chain model.

The state space may consist of three states, four states, or more than four states.

The state space may consist of n states where n is equal to three, four, or greater than four, wherein for n−1 states of the state space that correspond to an operative asset the transition probability to only one other state of the state space is non-zero, and for the state that corresponds to a failed asset there is no non-zero transition probability to any other state of the state space.

The method may further comprise receiving sensor measurement data captured during operation of the asset.

The method may further comprise updating the prognostic asset health state evolution based on the received sensor measurement data.

The plurality of simulations may comprise simulations for different ambient and/or operating scenarios.

The plurality of simulations may be performed in parallel.

The plurality of simulations may be performed concurrently.

The method may be a computer-implemented method.

The method may be performed by at least one integrated circuit.

The method may be performed by at least one integrated circuit of a central controller of a decentralized control system.

The method may be performed by at least one integrated circuit of a local controller of a decentralized control system.

The method may comprise receiving, by the at least one integrated circuit, information on the transition probabilities over a communication network.

The asset may be a power transformer, a distributed energy resource, DER, unit, or a power generator.

The prognostic horizon may be 1 year or more, 2 years or more, 3 years or more, 4 years or more, 5 years or more, 10 years or more, 15 years or more, or 20 years or more.

The prognostic horizon may be 1 week or more, 1 month or more, etc.

The prognostic horizon may be measured in and may include a plurality of cycles, e.g., a certain number of flight cycles, ship route cycles, train route cycles, etc.

A method of operating and/or maintaining an asset, comprises performing a prognostic asset health analysis for the asset using the method according to an embodiment and automatically taking a control or output action based on the prognostic asset health analysis.

The control or output action may comprise performing at least one of the following: generating an alarm or warning based on the computed prognostic asset health state evolution; generating a control signal to control operation of the asset based on the computed prognostic asset health state evolution; scheduling a down-time of the asset based on the computed prognostic asset health state evolution; scheduling maintenance work based on the computed prognostic asset health state evolution; scheduling replacement work based on the computed prognostic asset health state evolution; changing maintenance intervals based on the computed prognostic asset health state evolution.

The control or output action may comprise outputting information on a failure probability as a function of operating time, on a scheduled or rescheduled maintenance work interval, or on a scheduled replacement work interval via an interface.

A computing system operative to perform a prognostic health analysis for an asset according to the invention is configured to perform a plurality of independent stochastic simulations using transition probabilities of a discrete Markov Chain model, wherein the discrete Markov Chain model has a state space that comprises a set of asset health states and wherein each of the plurality of independent stochastic simulations simulates a future evolution in the state space of the discrete Markov Chain model over a prognostic horizon. The computing system is configured to compute a prognostic asset health state evolution over the prognostic horizon from the plurality of independent stochastic simulations. The computing system is configured to control generation of output based on the computed prognostic asset health state evolution.

The computing system may include a local controller having one or several integrated circuit(s) operative to perform the independent stochastic simulations and compute the prognostic asset health state evolution. The one or several IC(s) may be operative to perform the operations described in detail herein.

The computing system may include a central controller having one or several integrated circuit(s) operative to perform the independent stochastic simulations and compute the prognostic asset health state evolution. The one or several IC(s) may be operative to perform the operations described in detail herein.

The asset may be an electric power system asset.

The asset may be an industrial asset.

The computing system may be operative such that computing the prognostic asset health state evolution may comprise computing a RUL.

The computing system may be operative such that computing the prognostic asset health state evolution may comprise computing a probability of failure of the asset over the prognostic horizon as a function of time.

The computing system may be operative for computing confidence information for the prognostic asset health state evolution as a function of time over the prognostic horizon from the plurality of independent stochastic simulations.

The computing system may be operative such that the output may further be generated based on the confidence information.

The computing system may be operative such that the confidence information may comprise a time evolution of a confidence interval over the prognostic horizon.

The computing system may be operative for computing variance information for the prognostic asset health state evolution as a function of time over the prognostic horizon from the plurality of independent stochastic simulations.

The computing system may be operative such that the output may further be generated based on the variance information.

The computing system may be operative such that the output may comprise a representation of the evolution of the asset health state, an alarm or warning generated based on the evolution of the asset health state, and/or a control signal to control operation of the asset based on the evolution of the asset health state.

The computing system may be operative such that the variance information may comprise a time evolution of a variance interval over the prognostic horizon.

The computing system may be operative such that the confidence or variance information may comprise a time evolution of a lower boundary and a time evolution of an upper boundary.

The computing system may be operative such that the lower boundary may be associated with a first set of transition probabilities and the upper boundary may be associated with a second set of transition probabilities different from the first set of transition probabilities.

The computing system may be operative for deriving the first set of transition probabilities from first sensor data of assets operating under first conditions (e.g., first operating and/or ambient conditions) and deriving the second set of transition probabilities from second sensor data of assets operating under second conditions (e.g., second operating and/or ambient conditions) different from the first operating conditions.

The computing system may be operative such that the state space may consist of three states, four states, or more than four states.

The computing system may be operative such that the state space may comprise at least one state in which operation of the asset is not adversely affected by a failure.

The computing system may be operative such that the state space may comprise at least one state in which operation of the asset is adversely affected by a failure, but the asset continues to operate.

The computing system may be operative such that the state space may comprise a state in which the asset is inoperative due to a failure.

The computing system may be operative such that computing the prognostic asset health state evolution may comprise computing, for a plurality of times within the prognostic horizon, a probability distribution in the state space and mapping the probability distribution to a scalar.

The computing system may be operative such that the scalar may be the probability for the asset to be in the state in which the asset is inoperative due to a failure, as determined by the plurality of independent simulations.

The computing system may be operative such that the prognostic asset health state evolution may be obtained as a time evolution of the scalar.

The computing system may be operative for determining the transition probabilities from historical data comprising sensor data for a plurality of assets.

The computing system may be operative such that the sensor data may be labeled with failure signatures indicating at which time the respective asset was in which state of the state space of the Markov Chain model.

The computing system may be operative to automatically compute the failure signatures or receive input from a human expert that is used for determining the failure signatures.

The computing system may be operative such that determining the transition probabilities may comprise computing a time-dependent scalar function from the sensor data for the plurality of assets.

The computing system may be operative such that the scalar function may be computed using heuristics that use sensor measurements as inputs and output the scalar function.

The computing system may be operative such that determining the transition probabilities may comprise identifying transitions within the state space of the Markov Chain model based on the time-dependent scalar function.

The computing system may be operative such that determining the transition probabilities may comprise computing the transition probabilities based on the transitions within the state space of the Markov Chain model.

The computing system may be operative such that determining the transition probabilities may comprise comparing the scalar function to one or several thresholds.

The scalar function may be representative of a health index, indicating a severity of degradation.

The computing system may be operative such that the determination of the transition probabilities may be performed independently for different groups of sensor data, indicating different operating conditions and/or ambient conditions of the assets in the fleet.

The computing system may be operative for determining plural sets of transition probabilities, each associated with for different operating conditions and/or ambient conditions.

While plural sets of transition probabilities may be determined for different operating conditions and/or ambient conditions, the state space of the Markov Chain model may remain the same.

The computing system may be operative for selecting one of the plural sets of transition probabilities for performing the simulations, depending on the operating conditions and/or ambient conditions to which the asset is intended to be subjected.

The computing system may be operative for performing the plurality of independent stochastic simulations such that one or several first simulations are performed using a first set of transition probabilities associated with first operating conditions and/or first ambient conditions, and one or several second simulations are performed using a second set of transition probabilities associated with second operating conditions and/or second ambient conditions, wherein the first transition probabilities are different from the second transition probabilities.

The computing system may be operative such that different operating conditions may be indicative of different load, different voltage, different current, different operating points, and different insulation fluid, without being limited thereto.

The different ambient conditions may be indicative of different temperature, different relative humidity, without being limited thereto.

The computing system may be operative such that the plurality of independent stochastic simulations may be Markov Chain Monte Carlo (MCMC) simulations.

The computing system may be operative such that the Markov Chain may be homogeneous. The transition probabilities may be independent of time.

The computing system may be operative such that the Markov Chain may have order 1, i.e., transitions may be dependent on the state in which the Markov Chain model is currently, while being independent of previous transitions to that state.

The computing system may be operative such that each state of the state space may have a non-zero transition probability to at most one other state of the state space.

The computing system may be operative such that the Markov Chain model may be such that states of the state space that do not correspond to failure of the asset have a non-zero transition probability to just one other state of the state space.

The computing system may be operative such that the Markov Chain model may be such that a state of the state space that corresponds to failure of the asset does not have any non-zero transition probability to a state other than itself.

The computing system may be operative such that the Markov Chain model is a finite Markov Chain model.

The computing system may be operative such that the state space may consist of four or three states.

The computing system may be operative such that the state space may consist of n states where n is equal to three, four, or greater than four, wherein for n−1 states of the state space that correspond to an operative asset the transition probability to only one other state of the state space is non-zero, and for the state that corresponds to a failed asset there is no non-zero transition probability to any other state of the state space.

The computing system may be operative for receiving sensor measurement data captured during operation of the asset.

The computing system may be operative for updating the prognostic asset health state evolution based on the received sensor measurement data.

The computing system may be operative such that the plurality of simulations may comprise simulations for different ambient and/or operating scenarios.

The computing system may be operative such that the plurality of simulations are performed in parallel.

The computing system may be operative such that the plurality of simulations are performed concurrently.

The computing system has at least one integrated circuit to perform the recited operations. The recited operations may be performed in a distributed computing system, e.g., in a decentralized control system and/or using a cloud-based computing system.

The computing system may have an interface to receive information on the transition probabilities over a communication network.

The asset may be a power transformer, a distributed energy resource, DER, unit, or a power generator.

The prognostic horizon may be 1 year or more, 2 years or more, 3 years or more, 4 years or more, 5 years or more, 10 years or more, 15 years or more, or 20 years or more.

The prognostic horizon may be 1 week or more, 1 month or more, etc.

The prognostic horizon may be measured in and may include a plurality of cycles, e.g., a certain number of flight cycles, ship route cycles, train route cycles, etc.

A control system for an asset comprises the computing system for performing a prognostic asset health analysis for the asset using the method according to an embodiment and an output interface to automatically trigger or effect a control or output action based on the prognostic asset health analysis.

The control or output action may comprise performing at least one of the following: generating an alarm or warning based on the computed prognostic asset health state evolution; generating a control signal to control operation of the asset based on the computed prognostic asset health state evolution; scheduling a down-time of the asset based on the computed prognostic asset health state evolution; scheduling maintenance work based on the computed prognostic asset health state evolution; scheduling replacement work based on the computed prognostic asset health state evolution; changing maintenance intervals based on the computed prognostic asset health state evolution.

The control or output action may comprise outputting information on a failure probability as a function of operating time, on a scheduled or rescheduled maintenance work interval, or on a scheduled replacement work interval via an interface.

An industrial or power system, comprises an asset and the computing system to perform a prognostic asset health analysis for the asset.

The computing system may be a decentralized controller of the industrial or power system for controlling the asset.

Various effects and advantages are associated with the invention. When using a Markov Chain model with a discrete state space and non-zero transition probabilities to at most one other state of the Markov Chain model that corresponds to the next degree of severity of degradation, only a small number of parameters is requires. This is particularly the case when the Markov Chain model has a state space that may consist of a rather small number of states (e.g., three or four states, but optionally also a larger number of states), where only a small number of transition probabilities between the states is required for carrying out the method. The transition probabilities may be set based on a user input or may be determined automatically from sensor data with failure signatures, even when different types of sensor data are available for different assets in the fleet.

RUL curves or other prognostic asset health information may be determined starting from sensor data of arbitrary dimension based on the Markov Chain model, using stochastic simulation techniques.

The distribution of RUL curves or other prognostic asset health information may be determined based on the stochastic simulations for different ambient and/or operating conditions. This allows quantitative information to be provided not only for the expected RUL curve, but also its confidence interval. Precision and/or variance of the RUL distribution can be quantified and output.

By integrating multiple stochastic simulations into a simulation step that allows the stochastic simulations to be executed in parallel, high speed of computation may be attained.

Additional information can be generated, such as quantitative information on a variance or confidence interval of a RUL curve, which can be used in prescriptive tools or applications.

BRIEF DESCRIPTION OF THE DRAWINGS

The subject-matter of the invention will be explained in more detail with reference to preferred exemplary embodiments which are illustrated in the attached drawings, in which.

DETAILED DESCRIPTION OF ILLUSTRATIVE EMBODIMENTS

Exemplary embodiments of the invention will be described with reference to the drawings in which identical or similar reference signs designate identical or similar elements. While some embodiments will be described in the context of assets of a power system, such as distributed energy resource (DER) units or transformers, the embodiments are not limited thereto. The features of embodiments may be combined with each other, unless specifically noted otherwise.

Figure 1:
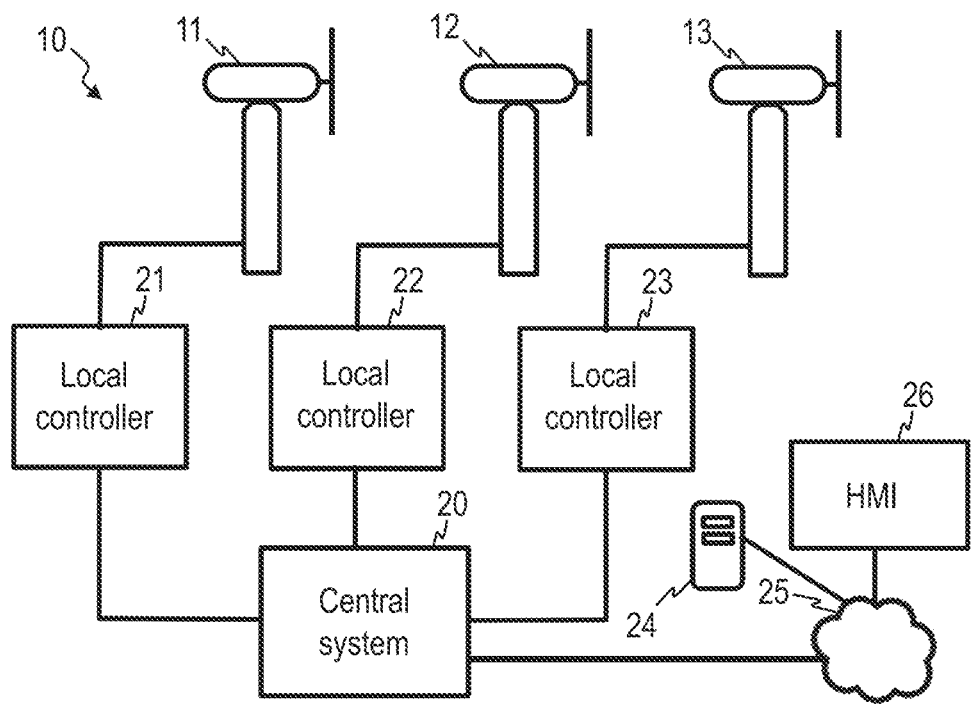
FIG. 1 is a schematic view of a power system having a computing system according to an embodiment.
Figure 2:
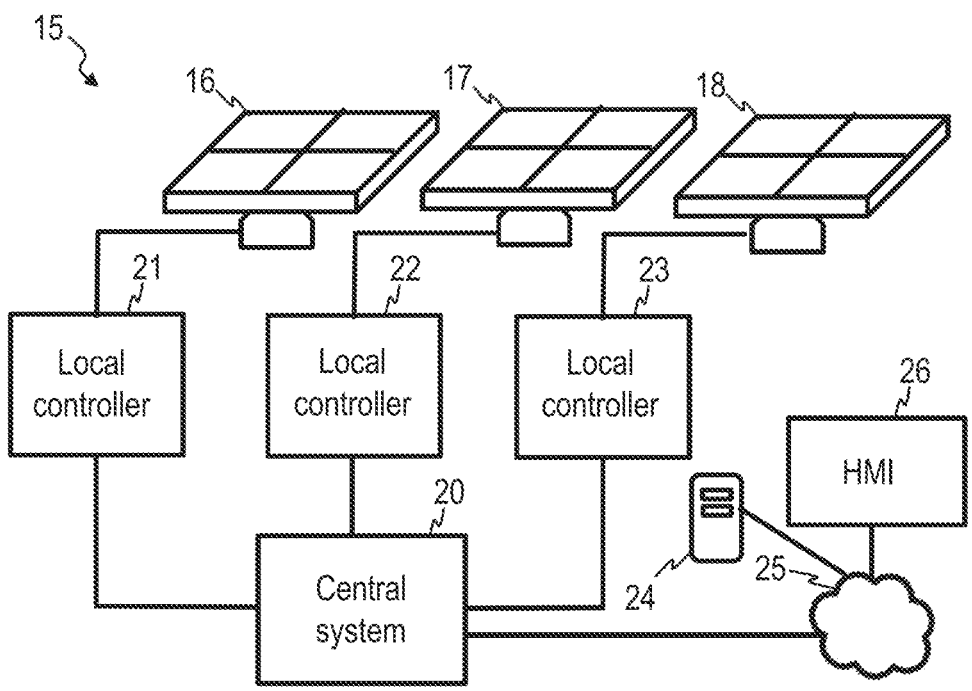
FIG. 2 is a schematic view of a power system having a computing system according to an embodiment.

FIGS. 1 and 2 are schematic views of a power system 10, 15. The power systems 10, 15 comprise a plurality of assets. The assets may include generators, such as distributed energy resource (DER) units 11-13, 16-18, transformers, or other electric power system assets.

The power system 10, 15 includes a control system comprising local controllers 21-23, each associated with an asset. The control system may include a central system 20. The central system 20 may be communicatively coupled with the local controllers. The central system 20 may be communicatively coupled with a remote (e.g., cloud-based) server system 24.

As will be described in more detail below, the local controllers 21-23, the central system 20, and/or the remote server system 24 may be operative to perform a prognostic asset health analysis, using a Markov Chain model. The Markov Chain model may have a specific configuration, as will be explained below. The local controllers 21-23, the central system 20, and/or the remote server system 24 may be operative to perform a plurality of independent stochastic simulations, in particular a Markov Chain Monte Carlo (MCMC) simulation, to perform the prognostic asset health analysis.

Results of the prognostic asset health analysis may be used by the local controllers 21-23, the central system 20, and/or the remote server system 24 for scheduling downtimes, maintenance work, replacement work or for automatically performing control operations. The local controllers 21-23, the central system 20, and/or the remote server system 24 may be operative to generate and output control or output data. Output may be provided via a human machine interface (HMI) 26. The HMI may be coupled to the local controllers 21-23, the central system 20, and/or the remote server system 24 via the internet or another wide area network (WAN).

As will be explained in more detail with reference to FIG. 3 to FIG. 10, the prognostic asset health analysis may involve simulating time-evolution of an asset. The MCMC simulations and further processing of the MCMC results may be performed at the local controllers 21-23. This facilitates the incorporation of local sensor measurements for updating the prognostic asset health analysis.

The techniques described herein may also be used when no sensor data are available for the specific asset for which the prognostic asset health analysis is performed. For illustration, a remaining useful life (RUL) curve or other prognostic asset health prediction may be computed for assets even when no sensor data is (yet) available, using a historical data repository that includes sensor data and information on failures captured for similar assets, preferably for assets of the same type as the asset for which the prognostic asset health analysis is performed.

Figure 3:
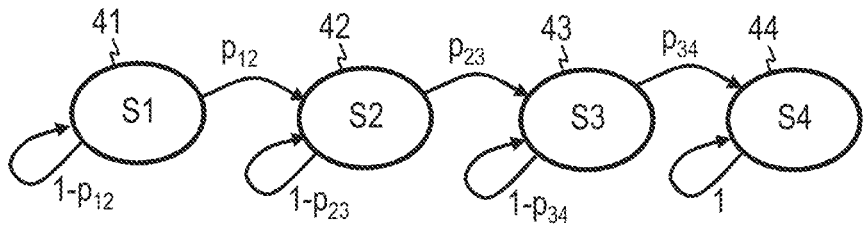
FIG. 3 is a diagram representing a Markov Chain model employed in embodiments.

FIG. 3 is a graph of a Markov Chain model that can be used in methods and computing systems according to embodiments. A state space of the Markov Chain model consists of a set of n states $S_1, \ldots, S_n$. In the present case, n=4. However, a state space having a different number of states (e.g., n=3 or n=5 or n>5) may be used instead.

The states of the state space may be ordered in such a manner that a severity of degradation of the asset health increases from S1 to S2, from S2 to S3, etc., i.e., all but the last state of the Markov Chain model may be followed by another state that represents a more severe degradation. The last state of the Markov Chain model may represent the most severe degradation.

The Markov Chain model may be set up in such a way that the $1^{st}, 2^{nd}, \ldots (n-1)^{th}$ state 41-43 have a non-zero transition probability $p_{12}, p_{23}, p_{34}$ to just one other state of the state space. The $n^{th}$ state 44 does not have a non-zero transition probability to a state other than itself.

For illustration, the Markov Chain model may be such that there is a finite transition probability $p_{12}$ from the first state 41 to the second state 42, but a zero transition probability from the second state 42 back to the first state 41. With probability $1-p_{12}$, the first state 41 is maintained in an iteration of the stochastic simulation.

The Markov Chain model may be such that there is a finite transition probability $p_{23}$ from the second state 42 to the third state 43, but a zero transition probability from the third state 43 back to the second state 42. With probability $1-p_{23}$, the second state 42 is maintained in an iteration of the stochastic simulation.

The Markov Chain model may be such that there is a finite transition probability $p_{34}$ from the third state 43 to the fourth state 44, but a zero transition probability from the fourth state 44 back to the third state 43. With probability $1-p_{34}$, the third state 43 is maintained in an iteration of the stochastic simulation.

The final state 44 of the Markov Chain model may correspond to a state in which the asset has failed to such a degree that it is no longer operative.

The other states 41-43 of the state space may correspond to different degrees of degradation.

For illustration, a first state 41 (which may also be referred to as "unknown" state S1) may correspond to an asset state in which there is no known degradation that would affect asset operation. For illustration, the first state 41 may correspond to a state in which no failures are recorded or in which no failures can be recorded.

A second state 42 (which may also be referred to as "incipient" state S2) may correspond to a detectable failure that are of such minor severity that they do not immediately affect the asset's performance. Such incipient failures are usually characterized by short Mean Time to Repair (MTTR), low repair costs, and low impact on overall performance. If not maintained properly, the incipient failures can evolve into more severe degraded failures.

A third state 43 (which may also be referred to as "degraded" state S3) may correspond to a mode that describes failures that significantly reduce the system's performance but do not lead to immediate asset shutdown. Usually such failures are caused by components deterioration. If left untreated, the degraded will eventually lead to the critical failure.

The fourth state 44 (which may also be referred to as "critical" state S4) may correspond to the most severe failure mode that causes an immediate and complete shutdown of the asset. It is usually characterized by long and costly (due to complete production loss) MTTR.

The transition probabilities of the Markov Chain model may be received via a user interface from a human expert or may be determined using historical data, as will be described below. Various sets of transition probabilities $p_{12}, p_{23}, p_{34}$ may be used. For illustration, N>1, in particular N>2 different sets of transition probabilities $p_{12}, p_{23}, p_{34}$ may be used to simulate the evolution of the asset health state under different ambient and/or operating conditions.

Figure 4:
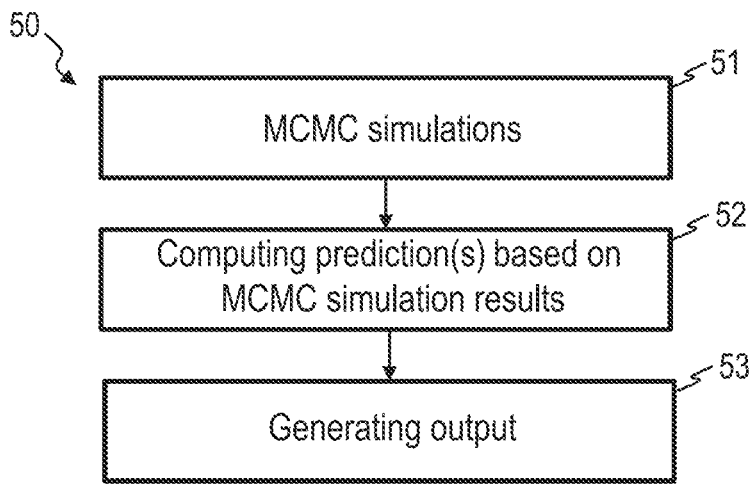
FIG. 4 is a flow chart of a method according to an embodiment.

FIG. 4 is a flow chart of a method 50 according to an embodiment. The method 50 may be performed automatically by one or several IC(s) in the local controllers 21-23, the central system 20, and/or the remote server system 24.

At step 51, MCMC simulations or other stochastic simulations of the Markov Chain model are performed. Step 51 may include performing more than 100, more than moo, more than 2000, more than 5000 simulations, more than 10000 simulations, more than 50000 simulations, more than 100000 simulations, more than 500000 simulations, or one million or more simulations. With increasing computational power, there is no upper bound for the number of simulations. The simulations may be performed in parallel.

While a large number of simulations (e.g., more than 100 or more than 1000) may be performed for any set of transition probabilities $p_{12}$, $p_{23}$, $p_{34}$ of the Markov Chain model, the transition probabilities need not be the same for all simulations. Different sets of transition probabilities $p_{12}$, $p_{23}$, $p_{34}$ may be used to quantitatively assess the impact of different operating conditions and/or ambient conditions.

The simulations may be performed over a time horizon. The time horizon may be dependent on the specific asset. For power system assets such as transformers, typical lifetimes are in excess of 10 years, in excess of 20 years, or even longer. Thus, the stochastic simulations may be performed over time horizons that are in excess of 10 years, in excess of 20 years, or even longer. The time horizons may also be shorter, depending on the asset. For illustration, the prognostic time horizon may be 1 week or more, 1 month or more, etc. The prognostic time horizon may be measured in and may include a plurality of cycles, e.g., a certain number of flight cycles, ship route cycles, train route cycles, etc.

An initial state for the simulations may be selected depending on information on the asset is available. If no information on the asset is available, the simulations may all start with the first state 41 in which there is no information on detectable failures. If information on the asset is available, e.g. sensor data collected after installation, this sensor data may be used for initializing the simulations. A distribution of initial states for the various MCMC or other stochastic simulations may be selected depending on whether the already collected sensor data indicates that there is no recognizable failure that affects asset performance or whether there are detectable issues that affect asset performance.

Furthermore, the initialization can be probabilistic. For illustration, if the information available is not conclusive whether the asset is in state 41 or 42 with equal chances to be in either of these states, the system can be initialized with a Bayesian prior distribution such that probability of the asset being in state 41 equals to 50% and probability of the asset being in state 42 equals to 50%. Other probabilistic initiations with more states and different probabilities may also be possible.

At step 52, the results of the stochastic simulations are processed. This may comprise computing a probability, as a function of time over the time horizon, that the Markov Chain model has evolved into the critical state that corresponds to an inoperative asset. The processing at step 53 may comprise computing a time evolution of a health index that, for any time during the prognostic time horizon, depends on the probabilities for the Markov Chain model to be in the $1^{st}$, $2^{nd}$ . . . , $n^{th}$ state 41-44 of the Markov Chain model. The processing may comprise computing a RUL curve or another output that indicates a probability of asset failure as a function of operating time.

At step 53, output may be generated. The output may include information on the asset's remaining useful life as a function of time. The output may include information on the asset's probability of failure as a function of time. The output may include control and/or output data that is obtained by further processing of the simulations results, such as a schedule for inspection, maintenance or replacement work on the asset.

Figure 5:
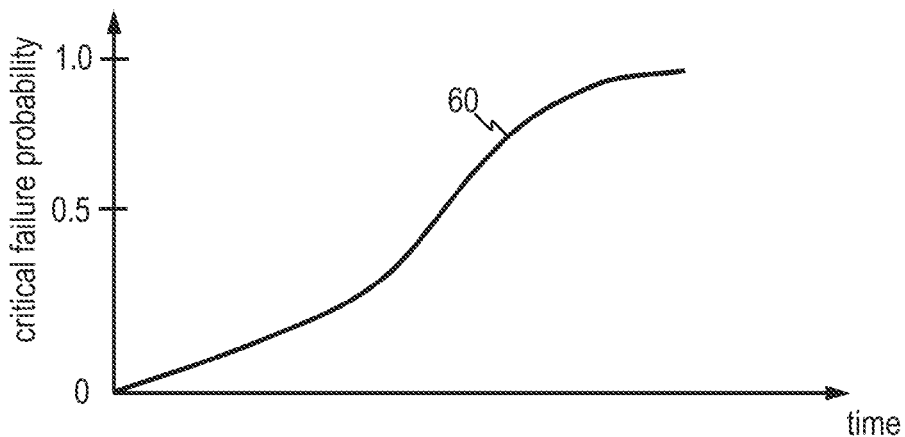
FIG. 5 is a graph illustrating exemplary output generated by a method and computing system according to an embodiment.

FIG. 5 is a schematic view of an output 60 that may be automatically generated and output. The output 60 may indicate the probability that the Markov Chain model has evolved into the critical state that corresponds to an inoperative asset. The output 60 may be determined by computing, for each one of a plurality of times over the time horizon, the fraction of simulations in which the Markov Chain model is in the critical state S4 of the state space.

Additional or alternative output may be generated. For illustration, a RUL curve or other information indicative of the asset's degradation may be processed to automatically schedule inspection, maintenance, or replacement work, to output the schedule information to an operator and/or to automatically schedule down-times.

Alternatively or additionally, the RUL curve or other information indicative of the asset's degradation may be processed, using threshold comparisons or other triggers, to determine whether and when alarms, warnings, or other signals are to be output to the operator.

Figure 6:
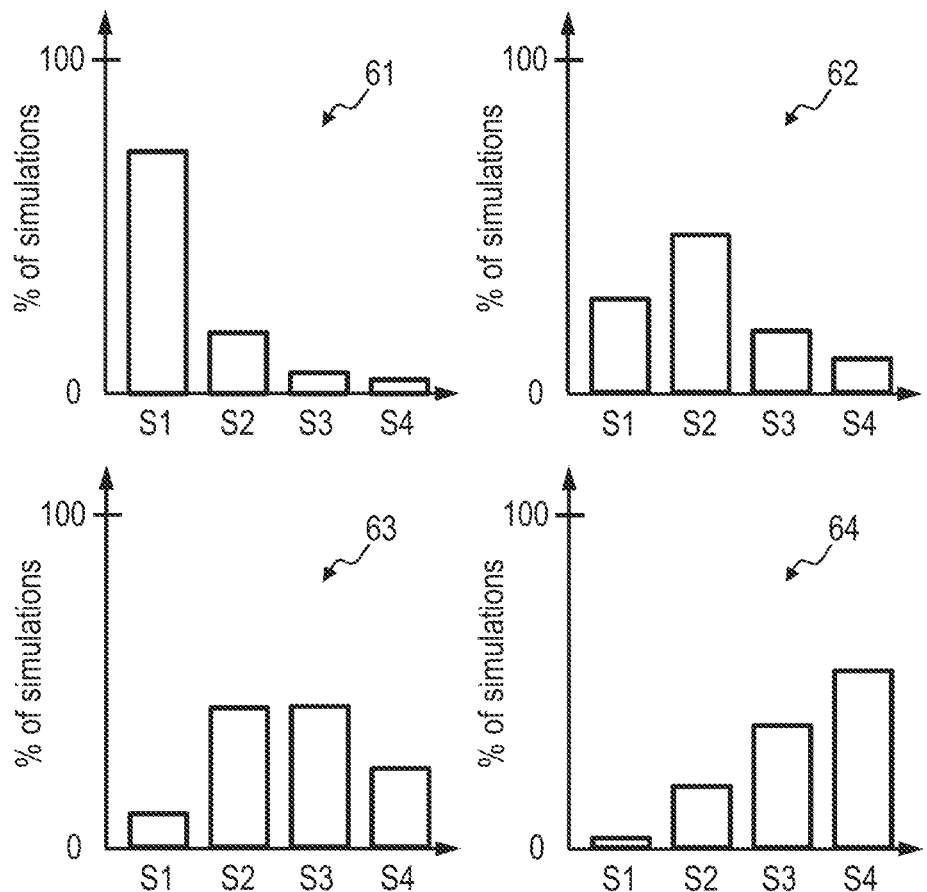
FIG. 6 are bar diagrams illustrating a time evolution of state occupation probabilities.

FIG. 6 illustrates the stochastic distribution 61-64 of the population of the various states S1-S4 of the state space of the Markov Chain model. The distribution 61 corresponds to a first time in which most of the Markov Chain model simulations are still in the state S1 that corresponds to an asset with no detectable degradation. The distributions 62, 63 correspond to later second and third times in which the states S2 and S3 that correspond to incipient or more advanced degradation have become more populated. The distribution 64 corresponds to an even later fourth time at which the critical state S4 corresponding to asset shutdown is populated most, reflecting that it is more probable for the asset to be in the inoperative state by that time than in an operative state.

While relevant prognostic asset health predictions may be obtained from the probability for the asset to be in the critical state S4, which is the final state of the Markov Chain model, the output into which the results of the stochastic simulations are processed may depend on all probabilities $p_1, p_2, \ldots p_n$ for the Markov Chain model to be in the respective $1^{st}$, $2^{nd}$, . . . , $n^{th}$ state, as determined by the stochastic simulations.

For illustration, for any time j within the time horizon over which the stochastic simulations are performed, a scalar function $$d(j)=\Sigma_{i=1,\ldots,n} p_i(j) \times m_i \qquad (1)$$

may be computed, where $p_i(j)$ designates the probability for the Markov Chain model to be in the $i^{th}$ state at time j, as determined by the stochastic simulations, and where $m_i$ denotes a scalar value that is a monotonous, in particular strictly monotonous, function of state label i. For illustration, all $m_i$ may be selected from an interval such that $m_1 \leq m_2 \leq \ldots \leq m_n$, in particular such that $m_1 \leq m_2 \leq \ldots \leq m_n$.

By outputting the function d(j) or information derived therefrom, a degradation that results in reduced RUL may be reflected more adequately even if it has not yet resulted in the asset reaching the critical state S4.

The function d(j) is indicative of a degradation and can be related to a health index h(j) by h(j)=1-d(j), when d(j) is constrained to take values between 0 and 1.

Figure 7:
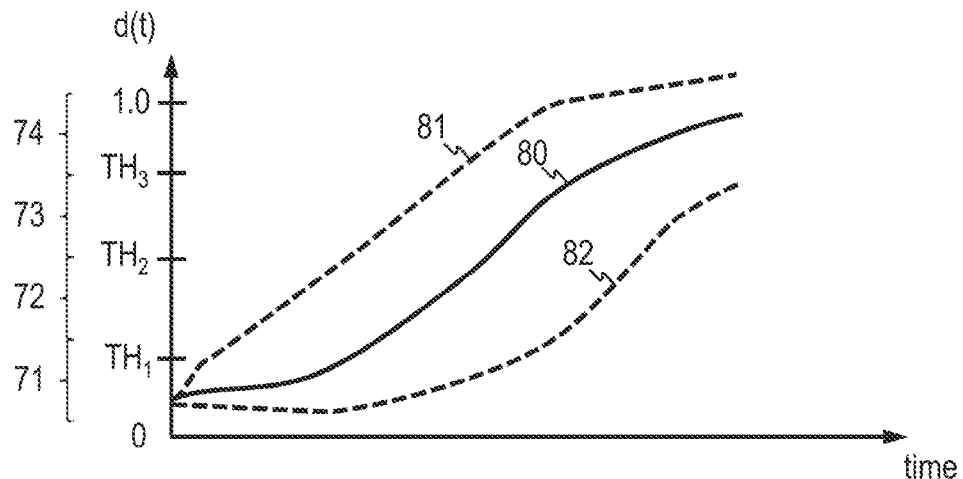
FIG. 7 is a graph illustrating exemplary output generated by a method and computing system according to an embodiment.

FIG. 7 illustrates an output of a curve 80 that is indicative of the asset's degradation as a function of time as determined by the stochastic simulations. The curve 80 may be dependent on the time evolution of all probabilities $p_1, p_2, \ldots p_n$ for the Markov Chain model to be in the respective $1^{st}, 2^{nd}, \ldots n^{th}$ state, as determined by the stochastic simulations.

The various states of the Markov Chain model may be associated with a plurality of intervals 71-74. For illustration, for a health index h within interval 71, the asset may be determined to be in the state S1 in which there is no known degradation. For a health index h within interval 72, the asset may be determined to be in the state S2 in which there is no incipient degradation that does not affect the performance. For a health index h within interval 73, the asset may be determined to be in the state S3 in which there is a more severe degradation that affects the performance, but does not lead to immediate asset shutdown. For a health index h within interval 74, the asset may be determined to be in the state S4 in which the state is critical, leading to immediate asset shutdown.

Thresholds $TH_1, \ldots TH_{n-1}$ may define the upper and lower boundaries of the intervals 71-74. Comparisons to threshold $TH_1, \ldots TH_{n-1}$ may be used when initializing the stochastic simulations for an asset. For illustration, available sensor data for the asset may be processed into a scalar representing the asset's health index h or degradation index d=1-h, and the scalar may be compared to the thresholds $TH_1, \ldots TH_{n-1}$ to determine how the simulations are to be initialized.

By performing stochastic simulations such as MCMC, not only the evolution of the asset's health state, but also the reliability associated with the determined evolution may be automatically determined and output.

The information on the reliability may take various forms. For illustration, an evolution of a confidence interval around the curves 60, 80 may be determined as a function of time over the prognostic time horizon. The time evolution of the confidence interval may indicate, for any time j of the prognostic time horizon, a lower boundary and an upper boundary for the critical failure probability 60 or for a health index h. The upper and lower boundaries may be determined such that at least a certain percentage (e.g., at least 70%, 80%, 90%, or 95%) of the stochastic simulations gives rise to a critical failure probability 60 or a health index h within the range between the upper and lower boundaries. Exemplary upper and lower boundaries 81, 82 indicating the time evolution of the confidence interval are shown in FIG. 7.

Alternatively or additionally, the upper and lower boundaries 81, 82 may reflect the variance in operating and/or ambient conditions to which the asset may be subjected. For illustration, the curves 80, 81, and 82 may each be obtained by performing plural stochastic simulations using a Markov Chain model as explained with reference to FIG. 3, but with different sets of transitions probabilities.

Figure 8A:
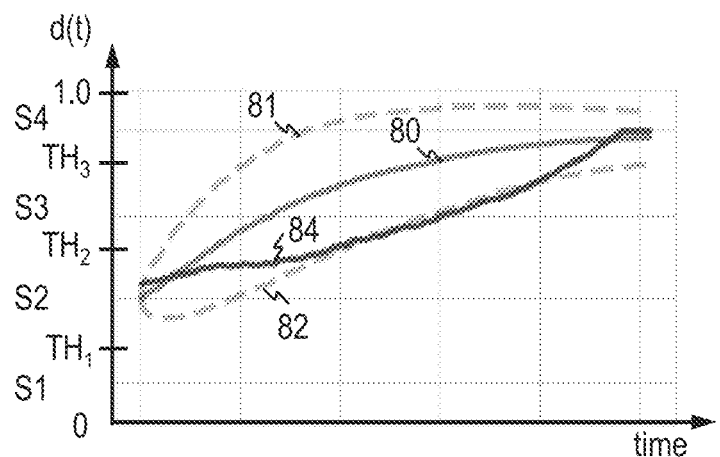
FIGS. 8A and 8B are graphs illustrating results of a prognostic asset health state analysis in combination with observed asset health states.
Figure 8B:
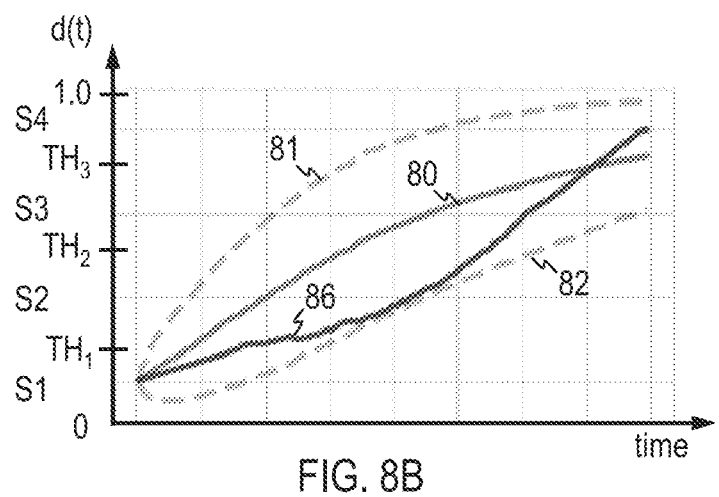

FIGS. 8A and 8B show the time-evolution of a health index 80 determined from the stochastic simulations and of upper and lower boundaries 81, 82 indicating the time evolution of the confidence interval. The curves 80-82 have been obtained by MCMC using transition probabilities determined from historical sensor data with associated failure signatures, allowing transitions between the states S1-S4 to be identified in the historical sensor data.

The curves 84, 86 represent the observed actual degradation of assets of the same asset type, but not included in the historical data used for determining the transition probabilities of the Markov Chain model. The degradation is indicated as evolution of a continuous function, which is a degradation index. Different states of the Markov Chain model may be associated with various ranges of the degradation index function.

The prognostic asset health analysis results 80-82 are stochastic results. While the actual state of an asset 84, 86 may also evolve differently than predicted by the curve 80 and/or the confidence interval evolution 81, 82, the prognostic asset health analysis results 80-82 reliably indicate the evolution of the asset degradation as determined on a large stochastic sample of assets.

Figure 9:
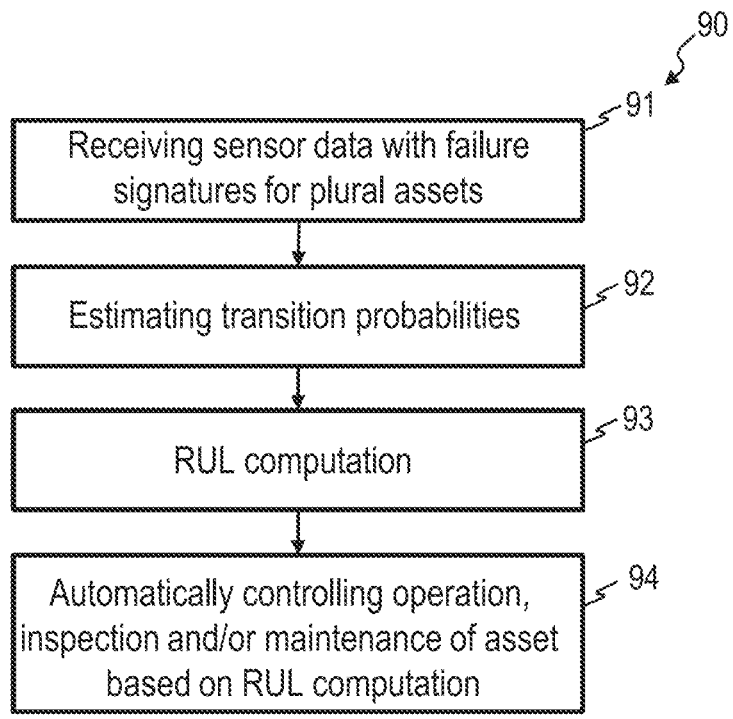
FIG. 9 is a flow chart of a method according to an embodiment.

FIG. 9 is a flow chart of a method 90 according to an embodiment. The method 90 may be performed automatically by the local controllers 21-23, the central system 20, and/or the remote server system 24. In one implementation, steps 91-92 of the method may be performed by central system or remote server system 24, while steps 93-94 may be performed by local controllers 21-23. In other variants, the steps 91-94 may be otherwise distributed over plural IC(s) of a processing system.

At step 91, sensor data is received. The sensor data may be historical sensor data of assets of the same asset type (e.g., photovoltaic panel with a certain power rating range; wind turbine generator with a certain power rating range; transformer of a rating in a certain interval) as the asset(s) for which the prognostic asset health analysis is to be performed.

The sensor data may be associated with a time period that exceed the prognostic time horizon in duration.

The sensor data may be labeled sensor data that includes information on states, e.g. on states S1-Sn. For illustration, for any set of sensor data, there may be information that associates the sensor data with one of the states S1, . . . , Sn of the Markov Chain model.

If the sensor data does not include the failure signatures, step 91 may include receiving, via a user interface, information from a human expert assigning the sensor data to the states S1, . . . , Sn of the Markov Chain model.

If the sensor data does not include the failure signatures, step 91 may include computing a scalar function from the sensor data, which is representative of the degradation or health index of the respective asset in the fleet, and comparing the scalar function to one or several thresholds (such as the thresholds TH1-TH3 in FIG. 7) to determine the times at which transitions between the S1, . . . , Sn have taken place based on the sensor data.

The scalar function may be computed from sensor measurements using heuristics.

The scalar function may take sensor measurements captured at various times as inputs and may process them into a scalar function that represents the observed evolution of asset health, as reflected by the health index h or degradation index d.

Various techniques may be used to compute the scalar function that is used to identify transitions between the discrete states. For illustration, sensor measurements may be compared to a range of operation values. For each sensor measurement outside the range, a penalty may be imposed. Weighted summation or other processing that combines products of a weighting factor for a sensor measurement and a value that depends on the deviation of the sensor measurement from the normal operation value range may be used. The weighting factors are dependent on the respective sensor and indicate the importance of the measurement for asset health.

Tools are known that provide a mapping of sensor measurements into a continuous health or degradation functions for a wide variety of assets, including, without limitation, circuit-breakers, batteries (such as Li-ion batteries), or transformers. For illustration, tools such as the Ellipse APM or RelCare tool process sensor measurements to provide a function having a value in a continuous range and indicating the asset health. Normalization may be used to normalize the health or degradation function to a desired range (such as from 0 to 1).

The techniques disclosed herein allow any health or degradation function to be mapped to the discrete states of the state model, using optional normalization and a threshold comparison.

At step 92, transition probabilities of the Markov Chain model may be determined. The transition probabilities may be determined automatically from the sensor data and the associated state labels.

In an exemplary implementation, the transition probabilities may be determined based on conditional probabilities. For illustration, the transition probability at a time j for a transition from the $i^{th}$ state to the $(i+1)^{th}$ state (where $1 \le i \le n-1$) may be determined as $$p_{1 \to i+1}(j) = \#(x_{j+1} = S_{i+1} \hat{} x_i = S_{1i})/\#(x_j = S_i). \qquad (2)$$

In Equation (2), the numerator represents the number of assets which were in the $i^{th}$ state at time j and transitioned to the $(i+1)^{th}$ state at time j+1. The denominator represents the number of assets which were in the $i^{th}$ state at time j.

The transition probabilities may be set and/or adjusted based on a user input. Averaging or other processing may be performed to obtain the probabilities of a homogeneous Markov Chain model.

When sensor data are available for different groups of assets that have the same asset type (e.g., photovoltaic panel with a certain power rating range; wind turbine generator with a certain power rating range; transformer of a rating in a certain interval), but which were subjected to different operating conditions and/or ambient conditions, the transition probabilities may be determined independently for each of the groups.

At step 93, the transition probabilities may be used to perform a RUL computation or to otherwise determine the time evolution of the degradation of one or several assets. This may involve MCMC simulations, followed by processing the results of the MCMC simulations to determine the RUL curve or another indicator for the time-dependent degradation of one or several assets.

Step 93 may comprise receiving, during operation of the asset, sensor data captured for the asset, and adapting the RUL computation based on the sensor data as they become available. This may comprise updating the MCMC simulations based on the sensor data as they become available.

At step 94, a control and/or output operation may be automatically performed based on the results of the RUL computation or other prognostic asset health analysis.

For illustration, the RUL curve may be output. Information on a time-evolution of a confidence interval or variance may be concurrently output.

Alternatively or additionally, an operating point of the asset may be automatically adjusted by the local controller 21-23 associated with the asset.

Alternatively or additionally, inspection, maintenance, and/or replacement work may be automatically scheduled.

Alternatively or additionally, down-times for inspection, maintenance, and/or replacement work may be automatically scheduled.

Alternatively or additionally, alarms, warnings, or other output may be generated for outputting via an HMI depending on the RUL curve or other prognostic asset health state evolution.

Figure 10:
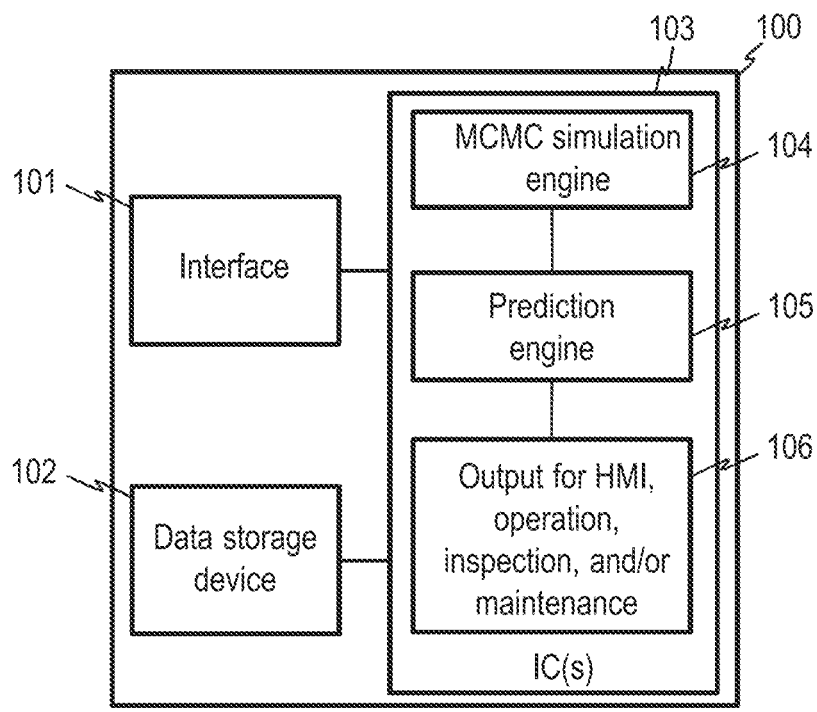
FIG. 10 is a block diagram of a computing system according to an embodiment.

FIG. 10 is a schematic diagram of a computing system 100. The computing system 100 may comprise one or several IC(s) 103. The IC(s) may include an application specific integrated circuits (ASIC), processor, controller, field programmable gate array (FGPA), or a combination of plural such integrated circuits.

The IC(s) 103 may reside in the central system 20, one of the local controllers 21-23, the server system 24, or may be distributed across these entities.

The IC(s) 103 may be operative to execute a stochastic simulation engine 104 to simulate the future evolution of an asset using a Markov Chain model. The stochastic simulation engine 104 may be adapted to perform MCMC simulations.

The transition probabilities for the Markov Chain model used by the stochastic simulation engine 104 may be received via an interface 101 (e.g., when the IC(s) 103 are resident in one of the local controllers 21-23 and the central system 20 computes the transition probabilities). The transition probabilities may be computed by the IC(s) 103 based on historical sensor data for a fleet of assets having the same asset type as the asset for which the prognostic asset health analysis is to be performed. The historical sensor data may be received via the interface 101 or may be stored locally in a data storage device 102.

The IC(s) 103 may be operative to execute a prediction engine 105. The prediction engine 105 may compute a RUL curve or other prognostic information associated with an asset health state evolution based on the results of the simulations performed by the stochastic simulation engine 104.

The IC(s) 103 may be operative to execute an output engine 106. The output engine 106 may generate output data or output signals for controlling an HMI and/or implementing a control operation for the asset or the system in which the asset is being used. For illustration, the output engine 106 may be operative to generate and output data to an HMI such that a RUL curve is output. The output engine 106 may be operative to generate and output data to the HMI such that information on a time-evolution of a confidence interval or variance may be concurrently output.

Alternatively or additionally, the output engine 106 may be operative to automatically adjust an operating point of the asset in response to the output of the prediction engine 105.

Alternatively or additionally, the output engine 106 may be operative to automatically generate and output information on inspection, maintenance, and/or replacement work.

Alternatively or additionally, the output engine 106 may be operative to automatically generate and output information on down-times for inspection, maintenance, and/or replacement work may be automatically scheduled.

Alternatively or additionally, the output engine 106 may be operative to automatically generate and output alarms, warnings, or other output may be generated for outputting via an HMI depending on the RUL curve or other prognostic asset health state evolution.

Various effects and advantages are associated with the invention. By using a Markov Chain model with a state space that may consist of a rather small number of states (e.g., three or four states), only a small number of transition probabilities between the states is required for carrying out the method. RUL curves or other prognostic asset health information may be determined efficiently. Quantitative information may be provided not only for the expected RUL curve, but also its confidence interval. Precision and/or variance information can be quantified and output.

The methods and systems according to the invention may be used in association with electric power system assets, such as assets of power generation, distribution and/or transmission systems, or assets of industrial systems, without being limited thereto.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

What is claimed is:

1. A method of performing a prognostic health analysis for an asset, the method comprising:
    performing a plurality of independent stochastic simulations using transition probabilities of a discrete Markov Chain model, wherein the discrete Markov Chain model has a state space that comprises a set of asset health states and wherein each of the plurality of independent stochastic simulations simulates a future evolution in the state space of the discrete Markov Chain model over a prognostic horizon, wherein different sets of transition probabilities between the asset health states are used for simulations of the plurality of independent stochastic simulations that are run in parallel, the different sets of transition probabilities being associated with different operating conditions or ambient conditions;
    computing a prognostic asset health state evolution over the prognostic horizon from the plurality of independent stochastic simulations, wherein computing the prognostic asset health state evolution comprises computing a time-dependent scalar function based on probabilities that the Markov Chain model is in a particular state at a particular time as determined from each of the plurality of independent stochastic simulations;
    generating output based on the computed prognostic asset health state evolution; and
    automatically performing an action relating to the asset based on the computed prognostic asset health state evolution.

2. The method of claim 1, wherein the asset is a power system asset or an industrial asset.

3. The method of claim 1, wherein generating the output comprises generating an output related to a remaining useful life (RUL) or a probability of failure (PoF).

4. The method of claim 1, wherein computing the prognostic asset health state evolution comprises computing a remaining useful life.

5. The method of claim 1, further comprising computing confidence or variance information for the prognostic asset health state evolution as a function of time over the prognostic horizon from the plurality of independent stochastic simulations, wherein the output is further generated based on the confidence or variance information.

6. The method of claim 5, wherein the output is further generated based on the confidence information and wherein the confidence information comprises a future evolution of a confidence interval over the prognostic horizon.

7. The method of claim 5, wherein the output is further generated based on the variance information and wherein the variance information comprises a future evolution of a variance over the prognostic horizon.

8. The method of claim 5, wherein the confidence or variance information comprises a time evolution of a lower boundary and a time evolution of an upper boundary, the lower boundary being associated with a first set of transition probabilities and the upper boundary being associated with a second set of transition probabilities different from the first set of transition probabilities.

9. The method of claim 1, wherein the state space comprises:
    at least one state in which operation of the asset is not adversely affected by a failure;
    at least one state in which operation of the asset is adversely affected by a failure, but the asset continues to operate; and
    a state in which the asset is inoperative due to a failure.

10. The method of claim 1, wherein computing the prognostic asset health state evolution comprises computing, for a plurality of times within the prognostic horizon, a probability distribution in the state space and mapping the probability distribution to a scalar.

11. The method of claim 10, wherein the prognostic asset health state evolution is obtained as a time evolution of the scalar.

12. The method of claim 1, further comprising determining the transition probabilities from historical data comprising sensor data for a plurality of assets.

13. The method of claim 12, wherein determining the transition probabilities comprises:
    computing the time-dependent scalar function from sensor data for the plurality of assets,
    identifying transitions within the state space of the discrete Markov Chain model based on the time-dependent scalar function, and
    computing the transition probabilities based on the transitions within the state space of the discrete Markov Chain model.

14. The method of claim 13, the determining the transition probabilities comprises comparing the time-dependent scalar function to one or several thresholds.

15. The method of claim 1, wherein the plurality of independent stochastic simulations are Markov Chain Monte Carlo simulations.

16. The method of claim 1, wherein the discrete Markov Chain model is homogeneous and wherein each state of the state space has a non-zero transition probability to at most one other state of the state space.

17. The method of claim 1, further comprising:
    receiving sensor measurement data captured during operation of the asset; and
    updating the prognostic asset health state evolution based on the received sensor measurement data.

18. The method of claim 1, wherein the plurality of simulations comprise simulations for different ambient or operating scenarios.

19. The method of claim 1, wherein:
    the asset is a power transformer, a distributed energy resource, DER, unit, or a power generator; or
    the prognostic horizon is 1 year or more.

20. The method of claim 2, wherein automatically causing an action comprises at least one of generating an alarm or warning based on the computed prognostic asset health state evolution, generating a control signal to control operation of the asset based on the computed prognostic asset health state evolution, scheduling a down-time of the asset based on the computed prognostic asset health state evolution, scheduling maintenance work based on the computed prognostic asset health state evolution, scheduling replacement work based on the computed prognostic asset health state evolution, or changing maintenance intervals based on the computed prognostic asset health state evolution.

21. A method of operating a power system asset or an industrial asset, the method comprising:
    obtaining sensor measurement data captured during operation of the asset or of another asset of the same or a similar type as the asset;
    performing a plurality of independent stochastic simulations based on the sensor measurement data and using transition probabilities of a discrete Markov Chain model, wherein the discrete Markov Chain model has a state space that comprises a set of asset health states and wherein each of the plurality of independent stochastic simulations simulates a future evolution in the state space of the discrete Markov Chain model over a prognostic horizon, wherein different sets of transition probabilities between the asset health states are used for simulations of the plurality of independent stochastic simulations that are run in parallel, the different sets of transition probabilities being associated with different operating conditions or ambient conditions;
    computing a prognostic asset health state evolution over the prognostic horizon from the plurality of independent stochastic simulations, wherein computing the prognostic asset health state evolution comprises computing a time-dependent scalar function based on probabilities that the Markov Chain model is in a particular state at a particular time as determined from each of the plurality of independent stochastic simulations; and
    automatically performing an action based on the computed prognostic asset health state evolution.

22. The method of claim 21, wherein automatically causing the action comprises at least one of generating an alarm or warning based on the computed prognostic asset health state evolution, generating a control signal to control operation of the asset based on the computed prognostic asset health state evolution, scheduling a down-time of the asset based on the computed prognostic asset health state evolution, scheduling maintenance work based on the computed prognostic asset health state evolution, scheduling replacement work based on the computed prognostic asset health state evolution, or changing maintenance intervals based on the computed prognostic asset health state evolution.

23. The method of claim 21, further comprising:
    obtaining additional sensor measurement data captured during further operation of the asset;
    updating the prognostic asset health state evolution based on the additional sensor measurement data; and
    automatically performing a second action at the asset based on the updated prognostic asset health state evolution.

24. A computing system operative to perform a prognostic health analysis for an asset of a power system asset or industrial asset, the computing system comprising at least one integrated circuit operative to:
    perform a plurality of independent stochastic simulations using transition probabilities of a discrete Markov Chain model, wherein the discrete Markov Chain model has a state space that comprises a set of asset health states and wherein each of the plurality of independent stochastic simulations simulates a future evolution in the state space of the discrete Markov Chain model over a prognostic horizon, wherein the at least one integrated circuit is operative to perform a plurality of independent stochastic simulations using transition probabilities of a discrete Markov Chain model, wherein different sets of transition probabilities between the asset health states are used for simulations of the plurality of independent stochastic simulations that are run in parallel, the different sets of transition probabilities being associated with different operating conditions or ambient conditions;
    compute a prognostic asset health state evolution over the prognostic horizon from the plurality of independent stochastic simulations, wherein computing the prognostic asset health state evolution comprises computing a time-dependent scalar function based on probabilities that the Markov Chain model is in a particular state at a particular time as determined from each of the plurality of independent stochastic simulations; and
    automatically control generation of output based on the computed prognostic asset health state evolution.

25. An industrial or power system comprising the computing system of claim 24, the system further comprising:
    the asset and
    the computing system being configured to perform a prognostic asset health analysis for the asset.

26. The system of claim 25, wherein the computing system is a decentralized controller of the industrial or power system for controlling the asset.

* * * * *